United States Patent [19]

Kaneko et al.

[11] Patent Number: 4,470,616
[45] Date of Patent: Sep. 11, 1984

[54] ANCHOR ARM FOR TORSION BAR

[75] Inventors: Tadao Kaneko, Toyota; Yoshihiko Ishimura, Hachioji, both of Japan

[73] Assignee: Toyota Jidosha Kabushiki Kaisha, Toyota, Japan

[21] Appl. No.: 413,160

[22] Filed: Aug. 30, 1982

[30] Foreign Application Priority Data

Feb. 15, 1982 [JP] Japan ............................ 57-18375[U]

[51] Int. Cl.³ ............................................. B60G 11/20
[52] U.S. Cl. ...................................... 280/721; 267/57
[58] Field of Search .......................... 280/721; 267/57; 138/89

[56] References Cited

U.S. PATENT DOCUMENTS 2,333,008 10/1943 Holmstrom et al. ................. 280/271
2,737,205 3/1956 Springfield ............................ 138/89

FOREIGN PATENT DOCUMENTS 2127146 2/1972 Fed. Rep. of Germany ...... 280/721

Primary Examiner—Joseph F. Peters, Jr.
Assistant Examiner—Kenneth R. Rice
Attorney, Agent, or Firm—Oblon, Fisher, Spivak, McCelland & Maier

[57] ABSTRACT

An anchor arm for a torsion bar has an opening into which is inserted one end of the torsion bar extending longitudinally of a car body and having the other end connected to a lower arm of a suspension. The anchor arm is provided with another opening spaced from the opening axially of the torsion bar. A cap or choke member is attached to an end of the anchor arm on the side of the another opening to seal liquid tightly the opening and be broken through or blown out by the torsion bar upon collision of a car.

5 Claims, 4 Drawing Figures

ANCHOR ARM FOR TORSION BAR

BACKGROUND OF THE INVENTION

1. Field of the Invention

This invention relates to an anchor arm for a torsion bar.

2. Description of the Prior Art

An automobile is preferably constructed to absorb impact energy by deformation of the front portion of the car body when it collides with something in travelling.

However, in the automobile in which a torsion bar, one end of which is connected to a lower arm of a suspension, extends longitudinally of the car body and the other end thereof is inserted into and supported by one opening of an anchor arm secured fixedly to the car body, a metal plate to prevent the inside of the anchor arm from infiltration of water and other foreign matters is fixedly secured by adhesive or welding to the other opening of the anchor arm which is provided spaced axially from the opening into which the torsion bar is inserted. Thus, said metal plate resists axial movement of the torsion bar upon collision of the car so as, to render the torsion bar immovable. As a result, the torsion bar will stretch against the front portion of the car so that the front portion is hardly deformed and proper absorption of energy cannot be accomplished.

SUMMARY OF THE INVENTION

Accordingly, an object of the present invention is to provide an anchor arm for a torsion bar which is capable of deforming the front portion of an automobile by removing resistance against axial movement of the torsion bar upon collision of the automobile.

According to the present invention, the anchor arm has two openings and a choke member is liquid-tightly to an end thereof on the side of one opening which is axially separate from the other opening into which the torsion bar is inserted. The choke member is broken by said torsion bar upon collision of the car. In another embodiment, the choke member is blown out by said torsion bar.

Various other objects, features and attendant advantages of the present invention will be more fully appreciated as the same becomes better understood from the following detailed description when considered in connection with the accompanying drawings in which like reference characters designate like or corresponding parts throughout the several views and wherein:

DETAILED DESCRIPTION OF THE PREFERRED EMBODIMENTS

Figure 1:
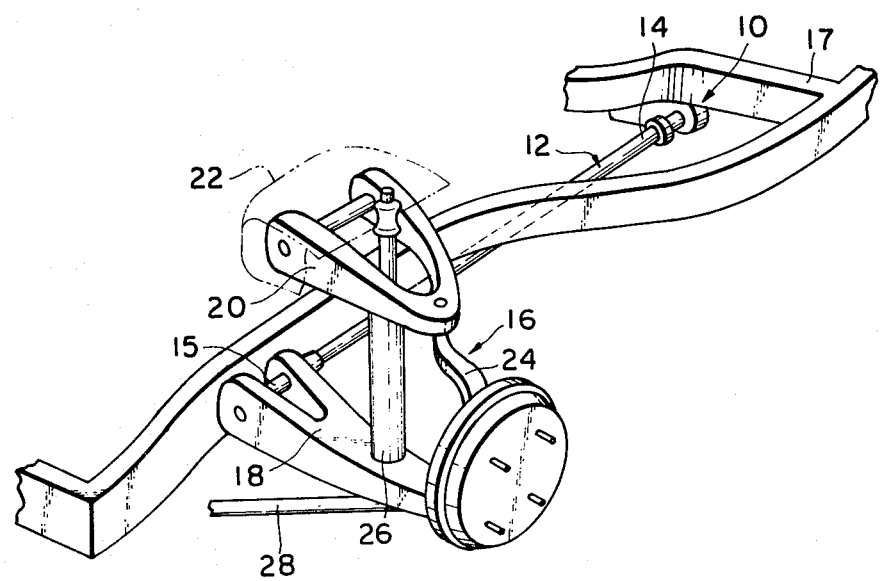
FIG. 1 is a perspective view showing a torsion bar connected to a lower arm of a suspension assembly on one end thereof and supported by the anchor arm according to the present invention on another end.

An anchor arm 10 according to the present invention supports a rear end portion 14 of a torsion bar 12 arranged to extend longitudinally of a car body as shown in FIG. 1. A front end 15 of this torsion bar 12 is connected to a lower arm 18 of a suspension assembly. The inner end of an upper arm 20 positioned above the lower arm 18 is oscillatably connected to the car body 22 and a wheel (not shown) is supported by a knuckle 24 arranged between the outer end of said upper arm 20 and the outer end of said lower arm 18. A shock absorber 26 is installed between the lower arm 18 and the upper portion of the car body and absorbs vibration added to the lower arm 18 together with said torsion bar 12. A strut bar 28 is arranged between the lower arm 18 and the car body to constrain forward and backward movement of the lower arm 18.

Figure 2:
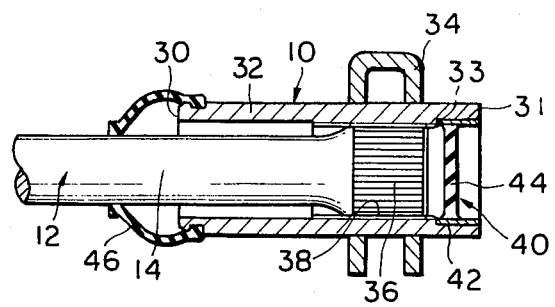
FIG. 2 is a cross-sectional view of the anchor arm according to the present invention.

As shown in FIG. 2, the anchor arm 10 comprises a tubular portion 32 having first and second openings 30, 31 and a mounting portion 34 secured fixedly to the tubular portion 32 and mounted on a cross member 17 (FIG. 1).

The torsion bar 12 inserted from said first opening 30 into the tubular portion 32 is provided on the end portion 14 with a serrated portion 36 which fits in a serrated portion 38 provided on the inner periphery of said tubular portion 32 so that the torsion bar 12 is supported by the anchor arm 10 so as not to rotate.

A cap or choke member 40 is attached to the inner peripheral end of the anchor arm 10 on the side of the second opening 31 to liquid-tightly seal the opening 31. This choke member 40 in an embodiment shown in FIG. 2 comprises a tubular member 42 of steel pipe and a diaphragm 44 of rubber, the latter being integrally attached to the inner peripheral surface of the tubular member 42 by heat treatment. The tubular member 42 cooperating with this diaphragm 44 is press fitted within the inner periphery of the tubular portion 32 and abuts a shoulder 33 thereof. Thus, liquid-tight sealing of the second opening 31 side is ensured. On the other hand, liquid-tight sealing of the first opening 30 side is ensured by a rubber boot 46. The bore of the tubular member 42 is formed so as to be larger than the outside diameter of the serration 36 of said torsion bar 12. Thus, upon collision of the car, the torsion bar 12 moves toward the choke member 40 so as to break through the diaphragm 44.

Figure 3:
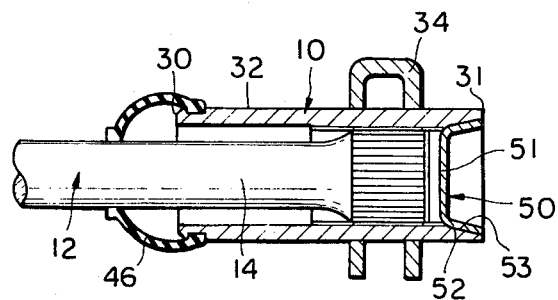
FIGS. 3 and 4 are cross-sectional views of the anchor arm of second and third embodiments.

In a second embodiment shown in FIG. 3, a cap or choke member 50 comprises a choke portion 51 and a tapered portion 52 and is formed by pressing of a plate member. The tapered portion 52 converges inwardly. A rust-preventive and antifrictional agent, such as grease is applied to the outer peripheral surface of the tapered portion 52 and the choke member 50 is press fitted in a tapered surface 53 provided in the inner peripheral surface of tubular portion adjacent to the opening 31. The constitution of other portions of the anchor arm 10 in this embodiment is the same as that in said one. In this embodiment the choke member 50 is blown out by an end of the torsion bar 12 in collision of the car.

Figure 4:
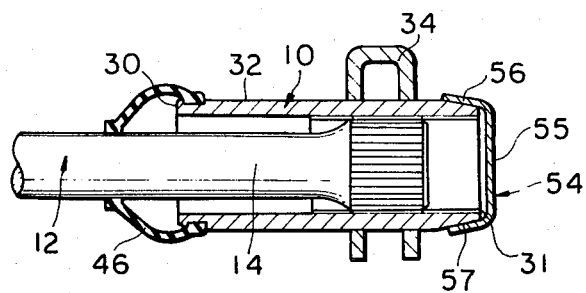

In a third embodiment shown in FIG. 4, a cap or choke member 54 comprises a choke portion 55 and a tapered portion 56 converging toward the opening 31 and is formed by pressing a plate member. The choke member 54 has the inner peripheral surface of the tapered portion 56 painted with a rust-preventive and antifrictional agent and is press fitted in a tapered surface 57 provided in the outer peripheral surface adjacent to the opening 31. In this embodiment, similar to that shown in FIG. 3, the choke member 54 will be blown out by an end of the torsion bar 12 upon collision of the car.

In said second and third embodiments, the surfaces in which the choke members 50, 54 are respectively press fitted are as previously noted, tapered and painted with an appropriate rust-preventive and antifrictional agent. Thus, resistance to removal of the choke members 50, 54 is sufficiently less than that of the conventional choke member wherein the fitting surface of which is instead cylindrical and on which no rust-preventive and antifrictional agent is applied, so that the choke members are easily blown out in accordance with the present invention, though the resistance to the removal of the choke members 50, 54 may be reduced only with the tapered surface.

The choke members 50, 54 may also be adhered to the tapered surface of the anchor arm 10 by an adhesive, such as silicone rubber.

According to the present invention, since the choke member is attached to the end of the anchor arm to close the opening liquid-tightly, there is no fear of infiltration of water or the like into the interior of the anchor arm. Further, since the impact upon collision of the car is transferred to the choke member by the torsion bar so as to break through or blow out the choke member, the torsion bar can freely move without any resistance. As a result, the front portion of the car is satisfactorily deformed so as to absorb the impact energy.

Obviously, numerous modifications and variations of the present invention are possible in light of the above teachings. It is therefore to be understood that within the scope of the appended claims, the invention may be practiced otherwise than as specifically described herein.

What is claimed is:

1. An anchor arm for a torsion bar of a vehicle, comprising:
    a tubular portion having a first opening into which an end of said torsion bar extending longitudinally of a body of said vehicle is inserted at a second opening spaced axially from said first opening; and
    a choke member including a tubular member and a diaphragm of rubber secured to said tubular member, said tubular member having a bore larger than an outside diameter of an end portion of said torsion bar and being press fitted in an end portion of said anchor arm on a side of said second opening so as to liquid-tightly seal said second opening and said diaphragm being breakable by said torsion bar upon collision of said vehicle.

2. An anchor arm as claimed in claim 1, further comprising means for integrally attaching said diaphragm to an inner peripheral surface of said tubular member.

3. An anchor arm for a torsion bar of a vehicle, comprising:
    a tubular portion having a first opening into which an end of said torsion bar extending longitudinally of a body of said vehicle is inserted and a second opening spaced axially from said first opening;
    a choke member including a choke portion and a tapered portion which is integral with said choke portion, said tapered portion being press fitted against a tapered surface provided on a peripheral portion of the end of the anchor arm on the side of said second opening to liquid-tightly seal said second opening, said choke member being removable by said torsion bar upon collision of said vehicle; and
    rust-preventative and antifrictional means located between said tapered portion and said tapered surface.

4. An anchor arm as claimed in claim 3, wherein said tapered portion converges inwardly.

5. An anchor arm as claimed in claim 3, wherein said tapered portion converges toward said second opening.

* * * * *